United States Patent Office 3,502,966
Patented Mar. 24, 1970

3,502,966
TRANSDUCER DEVICE FOR MEASURING THE RELATIVE POSITION OF TWO RELATIVELY MOVABLE OBJECTS
Maxim Izrailevich Perets, Ulitsa Kirova 33, kv. 6, and Jury Vladimirovich Bulgakov, Ulitsa Sverdlova 10, kv. 7, Riga, U.S.S.R.; Sigurd Yanovich Skrastin, Ulitsa Tallinas 22, Yurmala, U.S.S.R.; and Jury Ilich Peisakhovich, Ulitsa Grivas 11, korpus 22, kv. 43, Riga, U.S.S.R.
Filed June 5, 1967, Ser. No. 643,598
Int. Cl. G01r *33/04*
U.S. Cl. 324—34                      6 Claims

ABSTRACT OF THE DISCLOSURE

A transducer device is capable of measuring the relative speed and position of two relatively movable objects by connecting one object to a magnet and the other object to a magnetic yoke which carries windings adapted for being connected to a secondary measuring device. The yoke has a portion which interacts with the poles of the magnet and which is provided with a non-magnetic slot of constant width which is inclined with respect to the direction of relative movement of the magnet and yoke so that the relative speed and position of the magnet and yoke is determinable by the relative areas of the sections of the yoke on either side of the slot which face the magnet.

---

This invention relates to electrical devices for obtaining continuous information on the parameters of relative motion of objects, and mostly to transducer devices used in systems for automatically controlling and optimizing the performance of jiging-type conveying devices, that of devices for vibro-treatment of surfaces and control devices of automatic machine-tools.

Known in the art are transducer devices for measuring the parameters of relative motion of objects, comprising magnetically interacting a magnet and a magnetic yoke, both of them being independently coupled to the objects under control, said magnetic yoke carrying windings, wherefrom a signal is delivered to a secondary instrument.

A disadvantage inherent in the transducers mentioned above lies in an insufficiently wide range of linear dependence of the transducer output data upon the value of the parameter being measured.

There are also known transducer devices capable of measuring parameters of relative motion by the value of E.M.F. induced in a coil whose turns are arranged uniformly along the opposite arms of a closed magnetic yoke, when the magnet moves in the direction of the coil center line with its poles facing the aforesaid arms of the magnetic yoke.

However, the abovesaid transducer devices suffer from the disadvantage that the measuring accuracy thereof depends upon whether the uniformity of the coil winding pitch (or interturn spacing) is duly and correctly observed which substantially hampers and complicates the manufacturing of the transducer device, especially when the objects involved in relative motion travel over considerable distances.

In accordance with all stated above, an object of the invention is to provide a transducer device for measuring the parameters of relative motion of objects, said transducer device featuring linear dependence of the output data thereof upon the value of the parameter being measured within the widest possible range and under any principle of variation of the parameters involved.

Another object of the invention is to provide a transducer device of the character set forth in the preceding paragraph, which is capable of obtaining accurate and stable output data on the parameters being measured, at the same time being featured by simple design and easy manufacture.

A further object of the invention is to provide a non-contact transducer device capable of continuously measuring the parameters of relative motion of objects.

In accordance with the foregoing, a specific object of the invention is to eliminate the disadvantages mentioned above and to provide a non-contact transducer device capable of continuously measuring the parameters of relative motion of objects, said transducer device featuring linear dependence of the output data thereof upon the value of the parameter being measured within the entire operating range of said transducer, which transducer device is characterized by accuracy and stability of the output data thereof and is simple in design and easy in manufacture.

Said object is accomplished due to the fact that in the transducer device of the present invention, the magnetic yoke thereof is sectionalized and its sections adapted to interact with the poles of the magnet, are separated from one another with constant-area non-magnetic zones, said zones being located in planes intersecting that of the magnet poles and being inclined at a constant angle to the direction of relative motion of the magnet and magnetic yoke so that in each section of the magnetic yoke particular magnetic fluxes are closed, the value of said fluxes being proportional to the effective area of the magnetic yoke sections that interact with the magnet at each given instant of time.

The magnetic yoke may be a rectangular frame made of a ferromagnetic material and featuring a pair of symmetrical arms, part of which carry windings, whereas the other part adapted to interact with the magnet, are separated with linear non-magnetic zones which are mirror-symmetrical about the frame center line and are inclined at an angle to the direction of relative motion of the magnet and magnetic yoke.

When measuring the parameters of non-rectilinear relative motion of objects, the arms of the magnetic yoke separated with the non-magnetic zones are so shaped as to suit the path of motion of said objects.

When measuring the parameters of rotary relative motion of objects the abovesaid arms are made as closed rings provided with radial projections, whereon windings are located.

An embodiment of the present invention as described hereinbelow by way of example with reference to the accompanying drawings, wherein.

Figure 1:
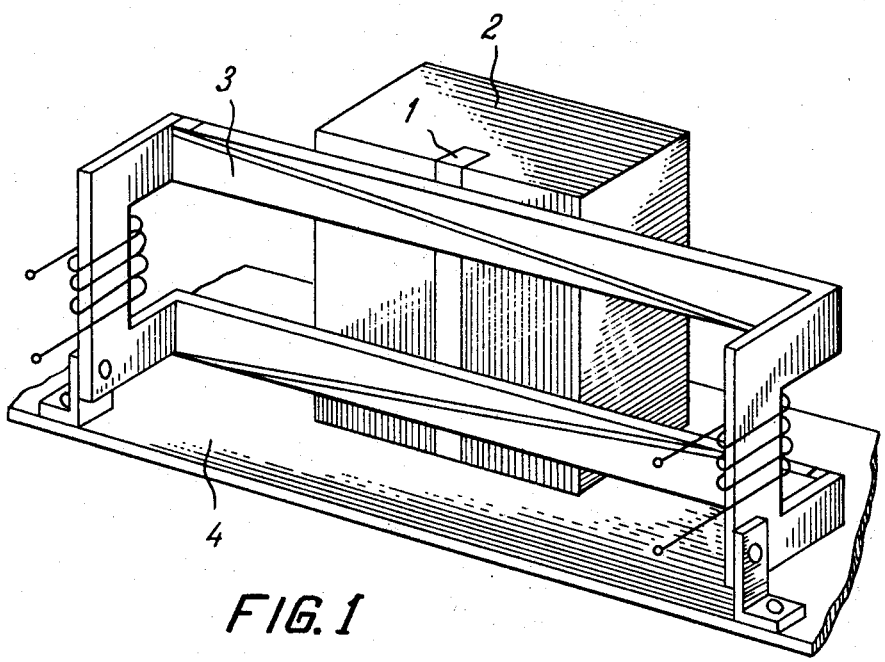
FIG. 1 is a schematic diagram of the transducer device of the invention when rectilinear relative motion of objects is involved.

Referring to the drawings, the transducer device for measuring the parameters of relative motion of objects comprises a magnet 1 (FIG. 1) coupled to one of the moving objects 2, and a magnetic yoke 3 coupled to another moving object 4.

Figure 2:
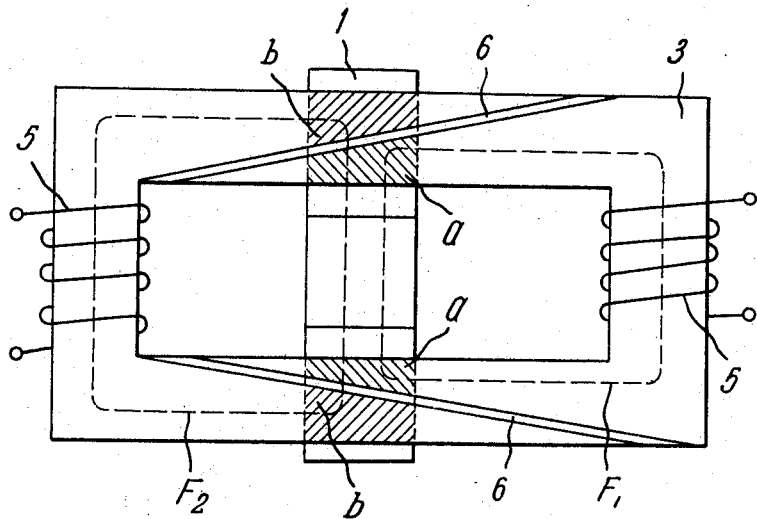
FIG. 2 is a diagram of closing of the magnetic fluxes in the transducer device of the invention.

The magnetic yoke 3 (FIG. 2) of the transducer is essentially a frame made of a ferro-magnetic material and having a symmetrical pair of arms, part of which carry windings 5, while the other part of the arms interacting with the poles of the magnet 1, are separated with constant-area non-magnetic zones 6 which are located in planes intersecting the plane of the poles of the magnet 1 and are inclined at a constant angle to the direction of relative motion of the magnet and magnetic yoke.

With the magnet 1 moving uniformly along the magnetic yoke 3, the ratio $a/b$ which expresses the relationship between the areas of those sections of the magnetic yoke 3 separated by the non-magnetic zones that are located against the poles of the magnet 1 and magnetically interact therewith, varies linearly over the entire path of relative motion performed by the magnet and magnetic yoke.

In case the transducer is employed to measure the parameters of relative motion of objects travelling over a complicated trajectory such as an arc-shaped one, the magnetic yoke arms separated with a non-magnetic gap are likewise made as arcs 7 (FIG. 3), and a magnet 8 coupled to one of the moving objects, is free to travel along said arc-shaped arms of the magnetic yoke. In all such cases the shape of the magnetic yoke arms separated by the non-magnetic gap is so selected as to suit the path of relative motion of the magnet and magnetic yoke.

Should the transducer be used for measuring the parameters of rotary relative motion of objects, the magnetic yoke arms separated with non-magnetic gaps are made as closed rings 9 (FIG. 4), the windings 5 being disposed on radial projections 10 which serve as the second pair of arms of said magnetic yoke. A magnetic 11 travels around a circular path along the rings 9 of the magnetic yoke.

The transducer device for measuring the parameters of relative motion of objects functions as follows.

When used for measuring the speed of relative motion of objects, the transducer device employs a permanent magnet.

As a result of magnetic interaction between the poles of the magnet 1 (FIG. 2) and magnetic yoke 3, individual magnetic fluxes $F_1$ and $F_2$ start flowing through the sections of the magnetic yoke that are separated with the non-magnetic zones 6, said fluxes closing through the magnet 1, their direction of flowing being invariable and their values being proportional to the areas $a$ and $b$ respectively. With the magnet 1 not moving relative to the magnetic yoke 3, the quantities $F_1$ and $F_2$ remain invariable and the windings 5 are inoperative. With the magnet 1 moving relative to the magnetic yoke 3, the ratio of areas $a/b$ and the value of the magnetic fluxes $F_1$ and $F_2$ vary correspondingly which results in an E.M.F. induced in the windings 5, whence it is delivered to the secondary instruments. When the magnet 1 moves uniformly with respect to the magnetic yoke 3, the relationship between the magnetic fluxes varies linearly due to linear variation of the ratio of areas $a/b$, the E.M.F. induced in the windings 5 is invariable, and its value is indicative of the speed of uniform relative motion. In case of non-uniform motion of the magnet 1 with respect to the magnetic yoke 3 the value of the E.M.F. induced in the windings 5 indicates the speed of relative motion at each given instant of time as a continuous signal proportional to the abovesaid speed and determining it unambiguously.

When utilized for measuring the coordinates of the relative position of objects, the transducer device makes use of an electromagnet supplied with alternating current. In this case the magnetic fluxes $F_1$ and $F_2$ are likewise alternating, thus inducing an E.M.F. in the windings 5 whose value unambiguously indicates the relative position of the objects involved.

Figure 3:
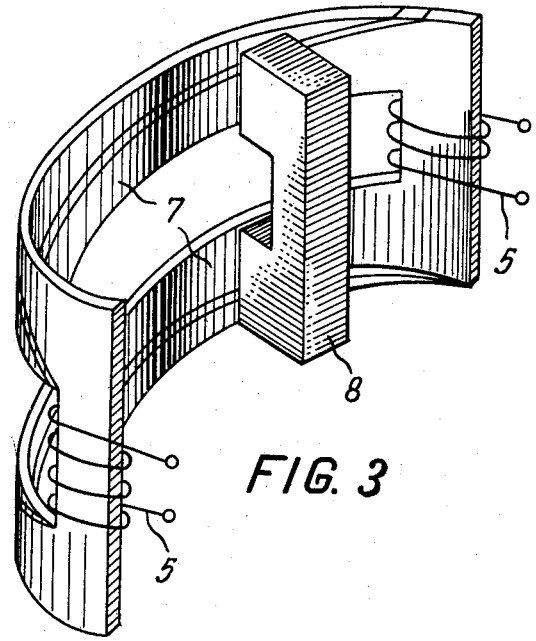
FIG. 3 is a schematic diagram of the transducer device of the invention when non-rectilinear relative motion of objects is encountered.
Figure 4:
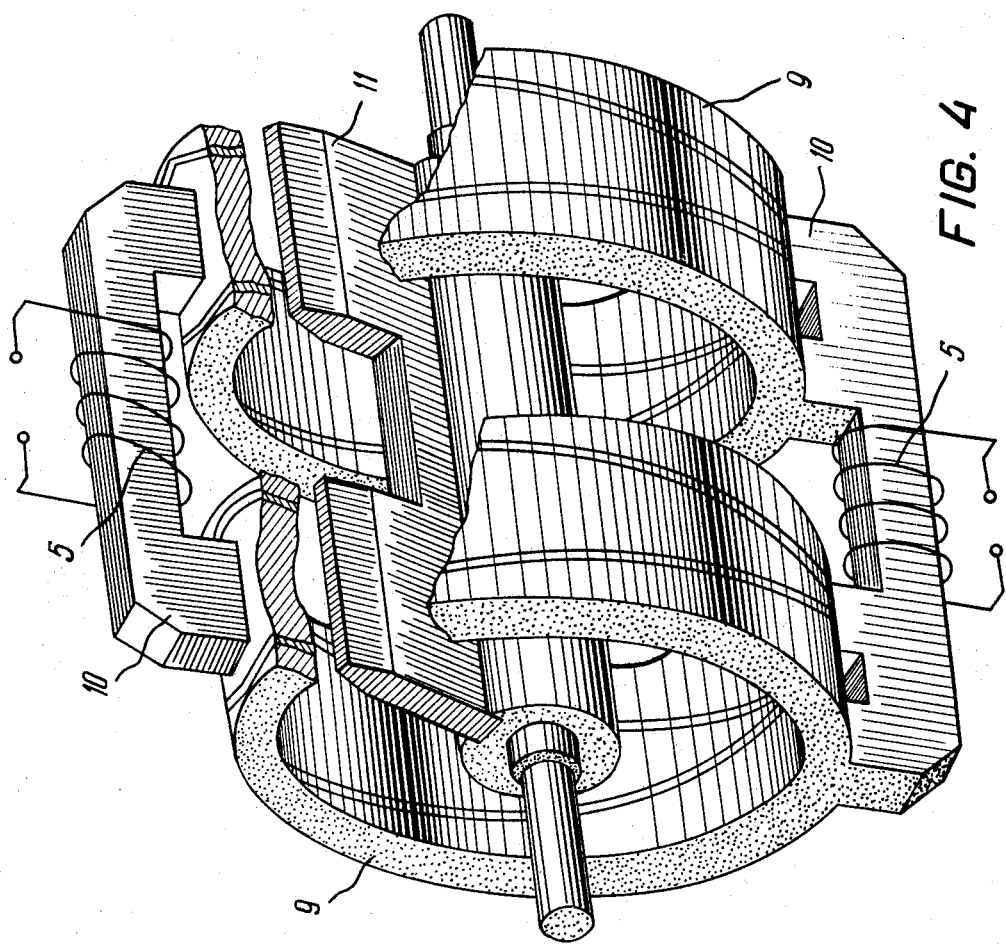
FIG. 4 is a schematic diagram of the transducer device of the present invention, applicable for rotary relative motion of objects.

The transducer devices represented in FIGS. 3 and 4 function in a manner similar to that described above.

What we claim is:

1. A transducer device for measuring the parameters of relative motion of two objects, said device comprising a magnet and a magnetic yoke magnetically interacting and independently coupled to the moving objects, said magnetic yoke being constituted as a loop including a pair of symmetrical sections; and coils on part of the pairs of sections of said magnetic yoke; said magnet having opposite pole ends in parallel, adjoining relation, respectively with the symmetrical sections of the magnetic yoke that are free from said coils; said latter sections being subdivided by mirror-symmetrical, inclined, non-magnetic zones forming in said sections pairs of wedges such that with a relative displacement of the magnet and the magnetic yoke with the sections subdivided into wedges, the ratio of the areas of the parts of the wedges, interacting with said pole ends of the magnet, varies linearly.

2. A transducer device as claimed in claim 1 wherein said sections of the magnetic yoke, which are free from the coils, are curvilinear to permit corresponding relative curvilinear motion between the magnet and the yoke.

3. A transducer device as claimed in claim 1 wherein said non-magnetic zones are slots of constant width.

4. A transducer device as claimed in claim 1 wherein said loop is rectangular.

5. A transducer device as claimed in claim 4 wherein said non-magnetic zones are slots of constant width.

6. A transducer device for measuring the parameters of relative motion of two objects, said device comprising: a magnet and a magnetic yoke magnetically interacting and independently coupled to the moving objects, said magnetic yoke comprising two closed rings with radial interconnecting projections; coils on said radial projections; said magnet having opposite pole ends in parallel, adjoining relation with said rings of the magnetic yoke, said magnet being adapted to rotate with respect to said rings, said rings having mirror-symmetrical non-magnetic zones in the form of helical lines forming sections in said rings in the form of pairs of wedges such that a relative rotation of the magnet and the rings of said magnetic yoke, the ratio of the areas of the parts of the wedges interacting with the pole ends of said magnet, varies linearly.

References Cited

FOREIGN PATENTS 1,032,931    6/1966    Great Britain.

ALFRED E. SMITH, Primary Examiner

U.S. Cl. X.R.

323—51; 336—133; 340—282